(12) United States Patent
Phillips

(10) Patent No.: US 11,606,987 B2
(45) Date of Patent: Mar. 21, 2023

(54) SELECTOR PROVIDING TACTILE FEEDBACK

(71) Applicant: Florida Institute for Human and Machine Cognition, Inc., Pensacola, FL (US)

(72) Inventor: Jeff Phillips, Pensacola, FL (US)

( * ) Notice: Subject to any disclaimer, the term of this patent is extended or adjusted under 35 U.S.C. 154(b) by 0 days.

(21) Appl. No.: 16/910,214

(22) Filed: Jun. 24, 2020

(65) Prior Publication Data

US 2020/0404993 A1 Dec. 31, 2020

Related U.S. Application Data

(60) Provisional application No. 62/866,035, filed on Jun. 25, 2019.

(51) Int. Cl.
*A41D 19/00* (2006.01)
*G06F 3/01* (2006.01)

(52) U.S. Cl.
CPC ......... *A41D 19/0024* (2013.01); *G06F 3/016* (2013.01)

(58) Field of Classification Search
CPC ............................ A41D 19/0024; G06F 3/016
See application file for complete search history.

(56) References Cited

U.S. PATENT DOCUMENTS

| | | | | |
|---|---|---|---|---|
| 7,874,021 B2* | 1/2011 | Sunder | ............. | A41D 19/01547 2/163 |
| 10,485,280 B1* | 11/2019 | DePriest | ................. | G06F 3/044 |
| 2005/0231471 A1* | 10/2005 | Mallard | ................... | G06F 3/014 345/156 |
| 2006/0221066 A1* | 10/2006 | Cascella | ............. | G06F 3/03545 345/179 |
| 2007/0245454 A1* | 10/2007 | Eklund | ................. | G06F 3/0488 2/161.6 |
| 2008/0297493 A1* | 12/2008 | Adkins | ............... | G06F 3/03545 345/179 |
| 2009/0000010 A1* | 1/2009 | Sunder | ............. | A41D 19/01547 2/163 |
| 2009/0183297 A1* | 7/2009 | Drosihn | ............. | A41D 19/0024 2/167 |
| 2011/0016609 A1* | 1/2011 | Phelps | .................... | G06F 3/014 2/162 |
| 2012/0159689 A1* | 6/2012 | Jiang | ...................... | B82Y 30/00 2/69 |
| 2013/0207900 A1* | 8/2013 | Harooni | ................ | G06F 3/0393 345/173 |
| 2014/0165262 A1* | 6/2014 | Klausner | ................. | G06F 3/014 2/161.1 |
| 2020/0249756 A1* | 8/2020 | Straza, II | ................ | G06F 3/014 |

* cited by examiner

*Primary Examiner* — Tadesse Hailu
(74) *Attorney, Agent, or Firm* — J. Wiley Horton

(57) ABSTRACT

A selector configured to provide tactile feedback to the user. The selector can be incorporated into the fingertip of a glove, or many other suitable locations. Different size selectors can be provided for different application. Arrays of multiple selectors can also be provided. An embodiment of the inventive device includes a central plunger lying behind a conductive covering. A tactile surface is provided on the rear of the plunger. A compressive element is positioned to urge the plunger toward the conductive covering. When a user presses the selector against a touchscreen, the plunger is pushed away from the touchscreen and the tactile surface on the plunger presses against the user. The pressing of the tactile surface provides feedback to the user.

20 Claims, 8 Drawing Sheets

SELECTOR PROVIDING TACTILE FEEDBACK

CROSS-REFERENCES TO RELATED APPLICATIONS

This non-provisional patent claims the benefit—pursuant to 37 C.F.R. § 1.53(c) of an earlier provisional application. The provisional application was filed on Jun. 25, 2019 and assigned Ser. No. 62/866,035. The provisional application listed the same inventor.

STATEMENT REGARDING FEDERALLY SPONSORED RESEARCH OR DEVELOPMENT

Not applicable

MICROFICHE APPENDIX

Not applicable

BACKGROUND OF THE INVENTION

1. Field of the Invention

This invention relates to the field of clothing. More specifically, the invention comprises a tactile touchscreen selector allowing a user to interact with a touchscreen device while wearing protecting clothing—such as gloves.

2. Description of the Related Art

Protective clothing is used in a wide variety of fields. Flight gloves used by military pilots provide a good example. Such gloves provide protection against cold conditions and—perhaps most significantly—fire. FIG. 1 provides a perspective view of a prior art glove 10. Gloves are made in many different ways. A common approach is to use a flat back trank joined to a flat palm trank via a ribbon of interconnecting material known as a fourchette. In the example of FIG. 1, back trank 14 is made of NOMEX (a meta-aramid polymer). NOMEX is often used because it combines flexibility and breathability with flame resistance.

Fourchette 20 is also made of NOMEX, but with an additional elasticizing element in the weave so that a higher degree of stretching is created. The version shown has a posterior extended fourchette 22. This allows increased radial elasticity for the glove. Thumb 24 is a separate component that is also stitched to fourchette 20. Cuff cinch 12 has a hook-and-loop tab that allows the cuff to be tightened.

The fourchette and trank materials often have different desired characteristics. For example, the trank material 16 might be selected primarily for breathability, whereas the fourchette material 18 might be selected primarily for abrasion resistance. The present invention can be utilized with virtually any combination.

FIG. 2 shows the same glove from the palm side. Palm trank 26 includes a high-friction coating. In this example a layer of rubber is bonded to a layer of NOMEX. The high-friction coating enhances grip. The reader in this view may see how fourchette 20 wraps around the four fingers and joins the back trank to the palm trank.

Many user interfaces now include capacitive touch screens. These screens allow a user to move a cursor by touching the screen with a fingertip and then moving the fingertip across the screen. Selections are made by pressing or tapping the finger against the screen. The detection of a selection or "pick" may be done by a resistive layer in the touchscreen. The resistive layer actually deforms to create a bridge circuit in the area of the pick. In more recent years, a user selection is often detected using raw position data fed through a software algorithm. The software actually detects the pick when a short-duration contact is detected over an icon display (as one example). In other cases a pick is detected when the pressing action broadens the contact point and this produces a change in the electrostatic field of a transparent conductor which is sensed and interpreted as a user "button push" or "pick" by the software associated with the touch screen.

The use of capacitive touch screen devices is impaired by the wearing of fabric gloves, since the fabric provides an insulating layer between the user's skin and the screen. FIG. 2 shows a prior art solution to this problem. Conductive patch 28 is included in the fourchette proximate the user's fingertip. This conductive patch is created by including a conducting fiber in the fabric weave. A separate patch of conductive cloth is often used (rather than including a conductive fiber in the entire glove) because the inclusion of the conductive fiber significantly increases the fabric cost.

The use of conductive patch 28 allows the user to move a cursor on a touchscreen device and also allows the user to make a selection by pressing (a software-registered "pick"). However, the moving and selection actions are quite clumsy compared to the user's bare fingertip. The lack of tactile feedback makes it difficult for the use to know how hard he or she is pressing. A light amount of pressure may cause the fabric of conductive patch 28 to flatten against the screen—causing the interface device to register a "pick" when no pick was intended. It is difficult for the user to accurately feel the pressure as he or she moves a finger around on the screen. The present invention provides a tactile feedback device that addresses this problem.

BRIEF SUMMARY OF THE INVENTION

The present invention comprises a selector configured to provide tactile feedback to the user. The selector can be incorporated into the fingertip of a glove, or many other suitable locations. Different size selectors can be provided for different application. Arrays of multiple selectors can also be provided.

An embodiment of the inventive device includes a central plunger lying behind a conductive covering. A tactile surface is provided on the rear of the plunger. A compressive element is positioned to urge the plunger toward the conductive covering. When a user presses the selector against a touchscreen, the plunger is pushed away from the touchscreen and the tactile surface on the plunger presses against the user. The pressing of the tactile surface provides feedback to the user.

Figure 1:
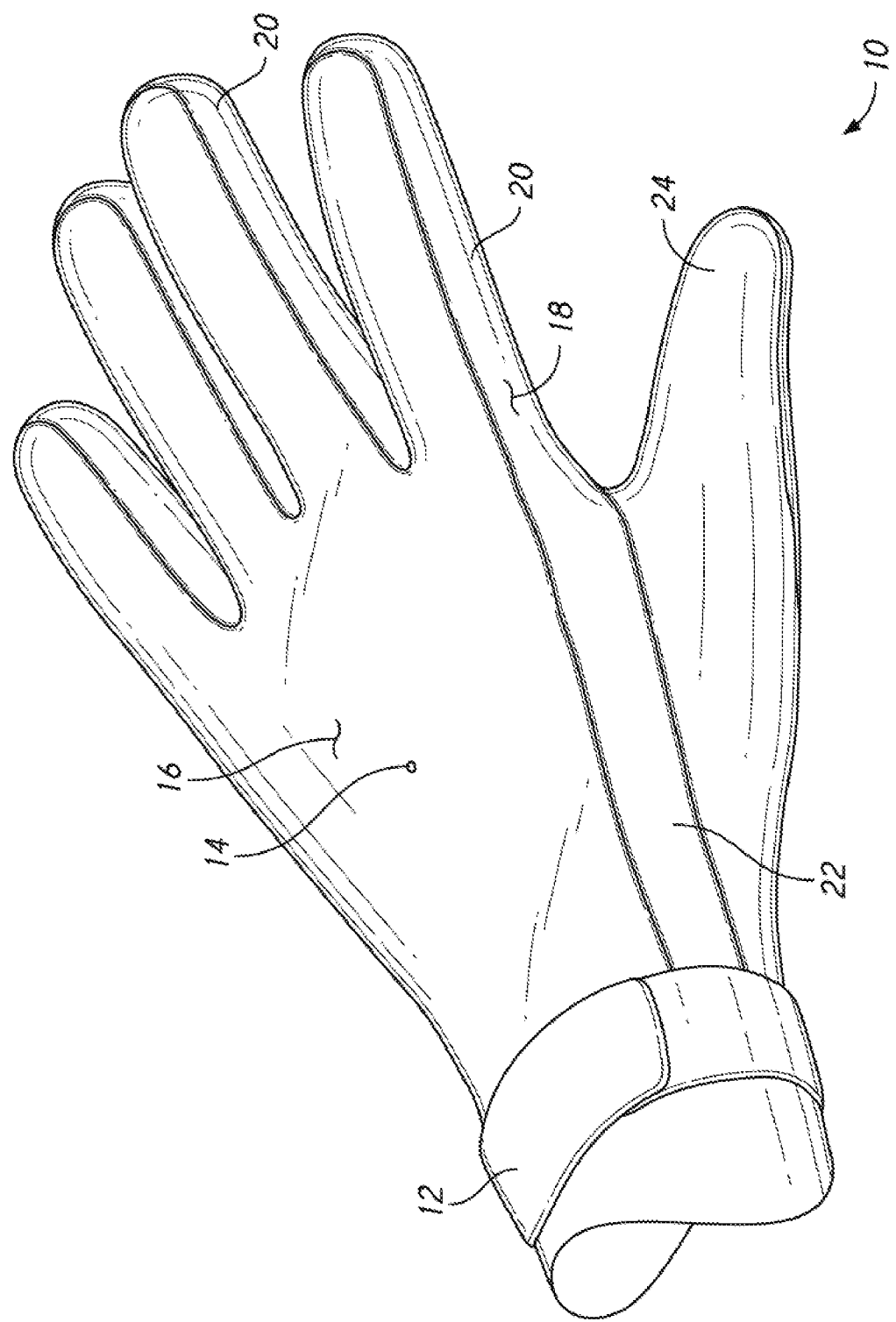
FIG. 1 is a perspective view, showing a prior art glove.
Figure 2:
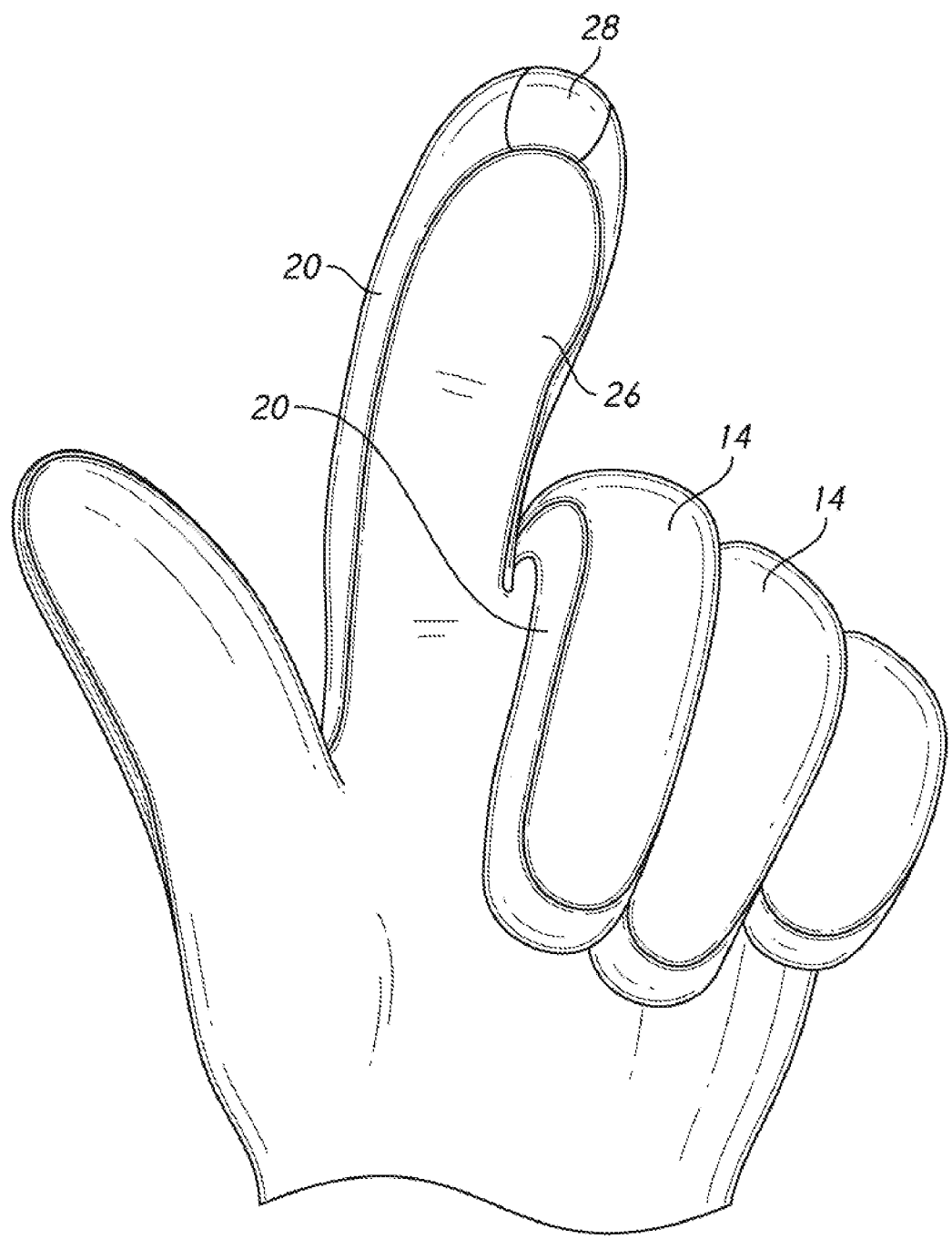
FIG. 2 is a perspective view, showing the glove of FIG. 1 from a different vantage point.

REFERENCE NUMERALS IN THE DRAWINGS 10 glove
12 cuff cinch
14 back trank
16 trank material
18 fourchette material
20 fourchette
22 posterior extended fourchette
24 thumb
26 palm trank
28 conductive patch
30 fingertip region
32 tactile touchscreen selector
34 conductive mesh
36 plunger
38 resilient collar
40 housing
42 fingertip
44 tactile surface
46 base
48 flange
50 touch screen
52 glove
54 icon
56 tactile indicator
58 overhanging portion
60 tip

DETAILED DESCRIPTION OF THE INVENTION

Figure 3:
FIG. 3 is a perspective view, showing a glove that incorporates the present invention.

FIG. 3 shows glove 52 incorporating the present invention. Tactile touchscreen selector 32 is added in fingertip region 30. The inventive tactile touchscreen selector can be added in any desired region, but the device will most often be placed in an area that is commonly used for interacting with a touchscreen device. Hence, in the version shown, the selector is placed near the tip of the index finger.

Figure 4:
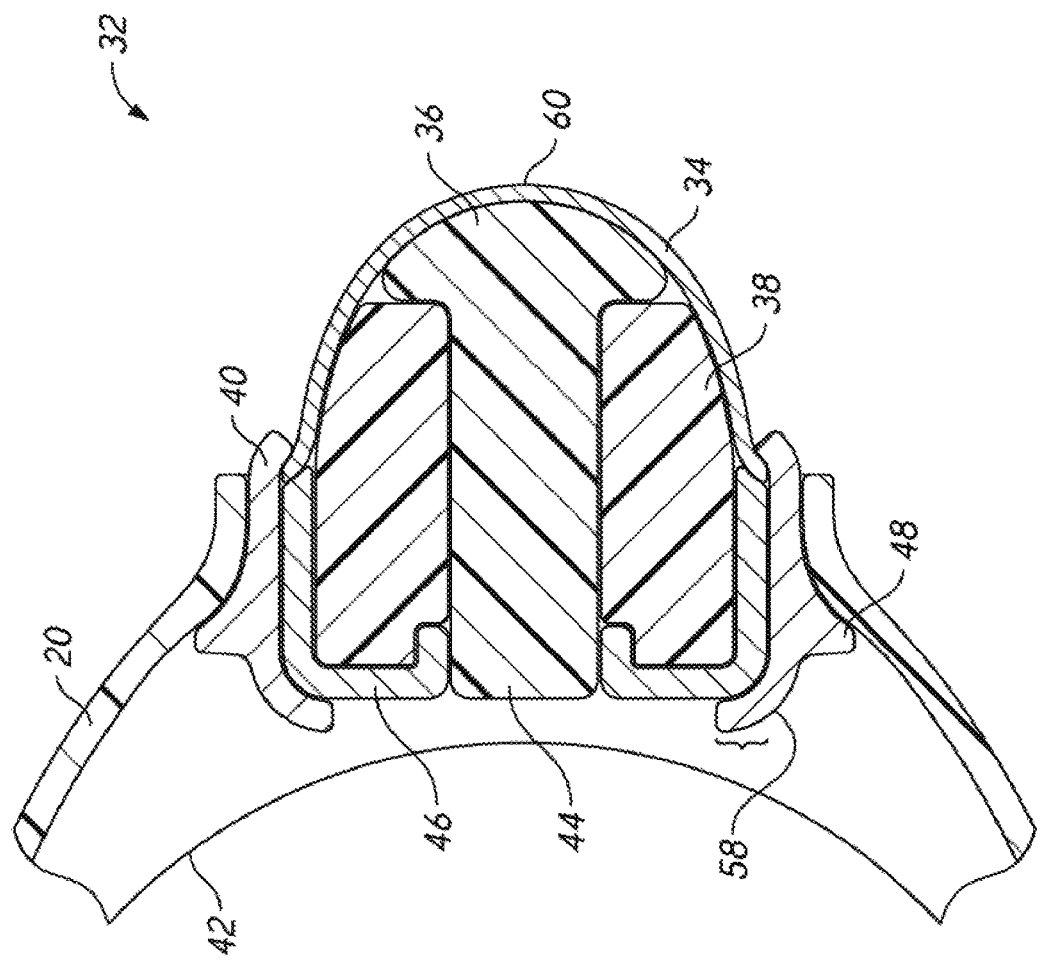
FIG. 4 is a sectional view, showing internal details of an embodiment of the invention.
Figure 5:
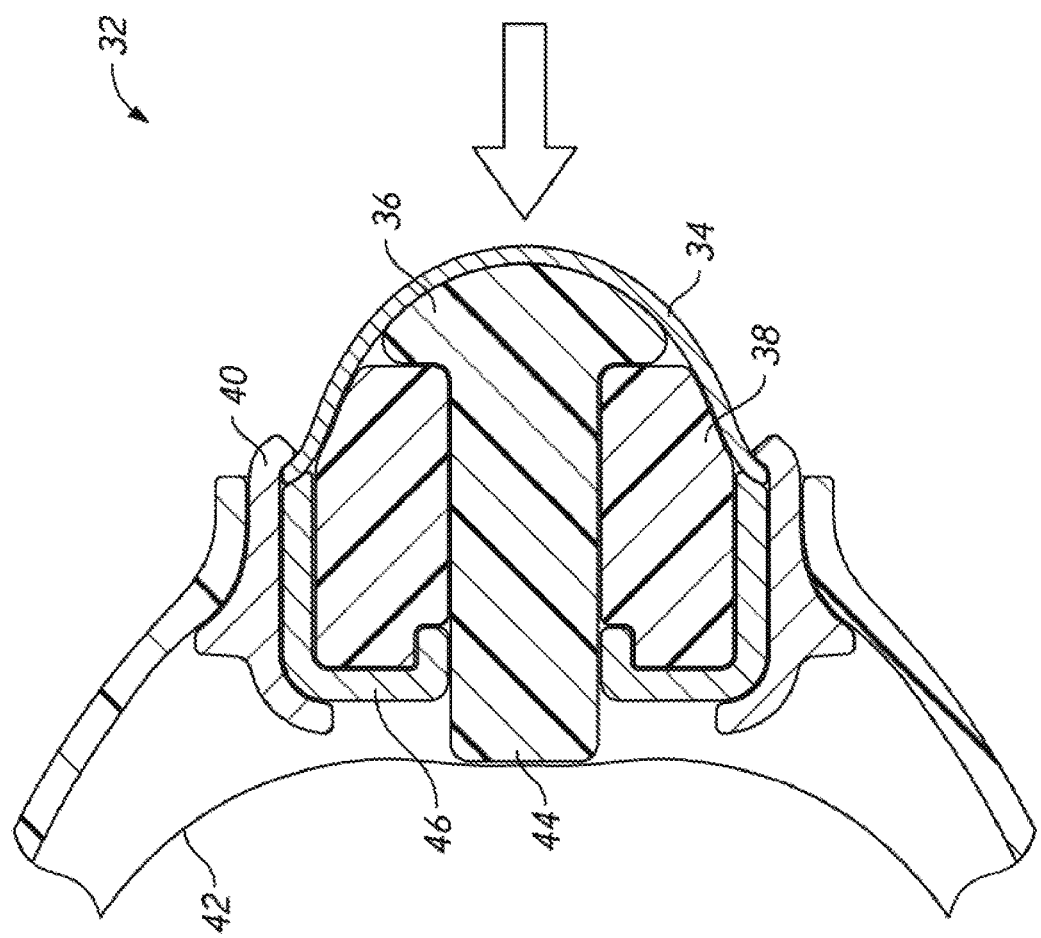
FIG. 5 is a sectional view, showing the embodiment of FIG. 4 when it is pressed against a surface.

FIGS. 4 and 5 provide a sectional view through an embodiment of the tactile touchscreen selector. In his example tactile touchscreen selector 32 is placed in a hole through fourchette 20—proximate the location of fingertip 42. Conductive mesh 34 is a flexible layer including conductive fibers. The mesh has a dome shape, with the tip 60 of the dome being on the right side of the view. Components of the assembly will be referred to as increasingly distal from this tip as one proceeds to the left in the orientation of the view. Thus, proximal in this context will mean further to the right and distal will mean further to the left.

The mesh has low electrical resistance across its thickness. Plunger 36 rests immediately behind the conductive mesh. An expanded section of the plunger contacts the back surface of conductive mesh 36. The body of the plunger assumes the form of a cylinder in this example. The portion of the plunger most distal to conductive mesh 34 is tactile surface 44.

The components are contained within housing 40. Overhanging portion 58 of housing 40 is shown in its final state—after it has been swaged over base 46. When the device is originally being assembled, overhanging portion 58 is straight. This allows conductive mesh 34 to be placed inside the housing, followed by plunger 36, resilient collar 38, and finally base 46. Once the components are assembled, they are placed in a holding fixture and overhanging portion 58 of housing 40 is swaged over the distal portion of base 46.

With the swaging operation, the outer perimeter of conductive mesh 34 is pinched between the proximal portion of housing 40 and the proximal portion of base 46. This action secures the conductive mesh in place. Base 46 is "captured" in position by the swaging operation that creates overhanging portion 58. Resilient collar 38 in this example is a compressible foam. It is somewhat compressed by the swaging operation so that conductive mesh 34 is maintained in tension. The resilient collar tends to urge plunger 36 to the right in the view. Many different spring elements (defined as anything tending to urge the plunger toward the tip of the conductive mesh) could be used for this purpose. As one example, a compression spring surrounding the cylindrical portion of plunger 36 could substitute for resilient collar 38 and provide the desired spring element.

Housing 40 is connected to the fabric of the glove or other garment. In this example, housing 40 is connected to fourchette 20. The fourchette is made of elastic material. A somewhat undersized hole is punched or cut in this material. The assembled tactile touchscreen selector 32 is then pushed through the hole from left to right. Housing 40 is provided with flange 48—which tends to arrest any further progress through the hole. Frictional forces alone may be sufficient to hold the assembly in place. However, in many applications, it is desirable to add an adhesive between the fourchette material (around the hole's perimeter) and flange 48 of housing 40.

FIG. 5 shows the assembly of FIG. 4 in an actuated state. In this case, the user has pressed conductive mesh 34 against the surface of a touchscreen. This action has propelled plunger 36 in the distal direction and caused tactile surface 44 to protrude from the rear of base 46. Tactile surface 44 presses into the user's fingertip 42, and this is easily perceived. Thus, the user is given positive tactile feedback as to when a "pick" has been made on the touchscreen.

It is possible to "tune" the characteristics of the tactile touchscreen selector so that the user just perceives the protrusion of tactile surface 44 when a "pick" has been made on the touchscreen. This can be done via changing the spring coefficient on the spring element (resilient collar 38 in this example).

In the example of FIGS. 4 and 5, the outer diameter of housing 40 (excluding flange 48) is about 8 mm (0.315 inches). The overall depth of the device (from left to right in FIGS. 4 and 5) is also about 8 mm. The device is thus quite small and easy to add in many suitable locations.

Figure 6:
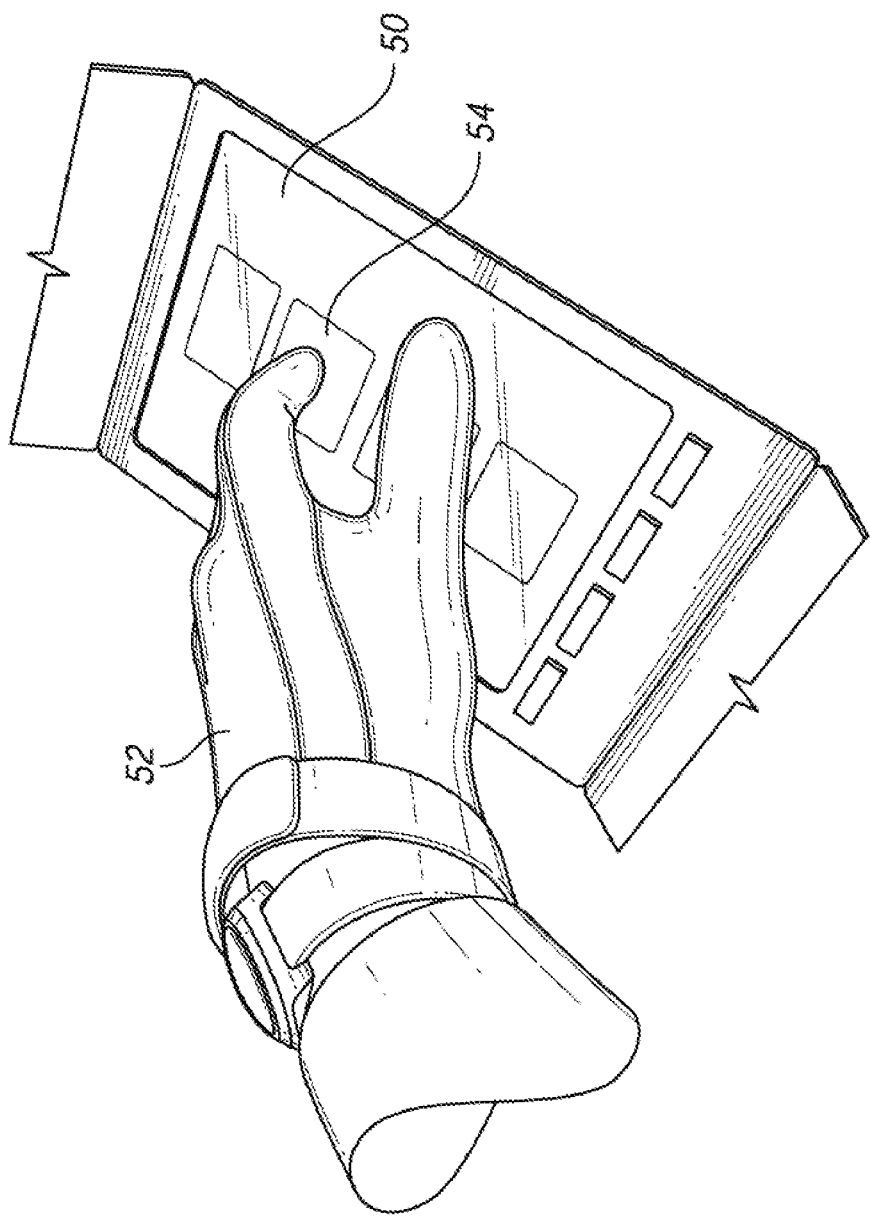
FIG. 6 is a perspective view, showing the user of a glove incorporating the invention to interact with a touchscreen.

FIG. 6 shows glove 52 (made according to the present invention) being used to interact with touchscreen 50 and make a "pick" on a particular displayed icon 54. In this example the tactile touchscreen indicator is in the position shown in FIG. 3 (tip of the index finger). However, those skilled in the art will know that it is sometimes convenient to use multiple contact points with a touchscreen. Multiple points are used for zooming operations and for reorientation operations.

Figure 7:
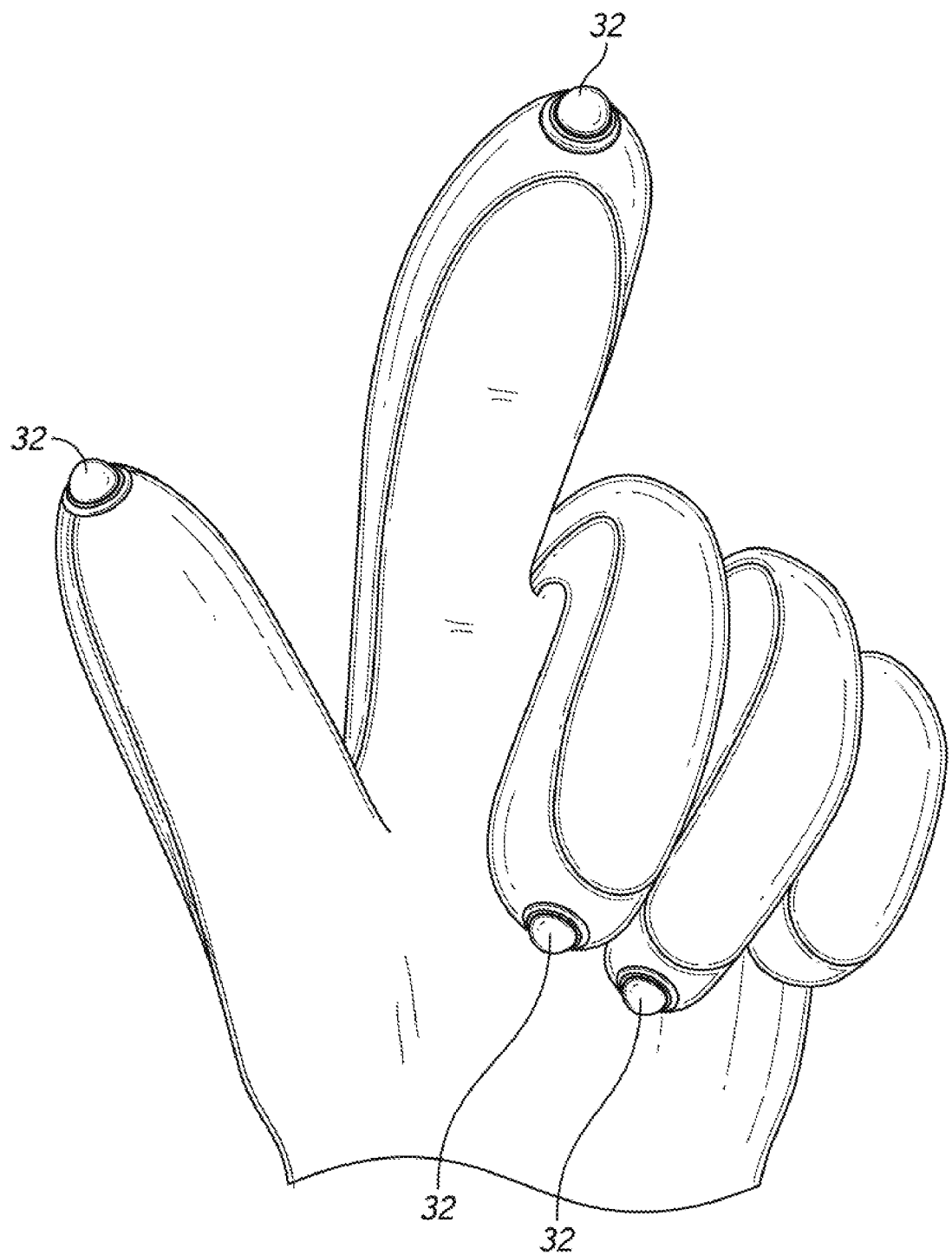
FIG. 7 is a perspective view, showing the incorporation of multiple touchscreen selectors on a single glove.

FIG. 7 shows another inventive embodiment in which four tactile touchscreen selectors 32 are included. These selectors are preferably placed in a position where the digit will naturally contact a touchscreen. These positions may need to be customized for some users. For instance, some users will prefer the tip of the thumb while other users will prefer the side of the thumb. It is possible to add the inventive selector by simply punching an undersized hole in the desired location and pressing the selector assembly through from the inside.

Figure 8:
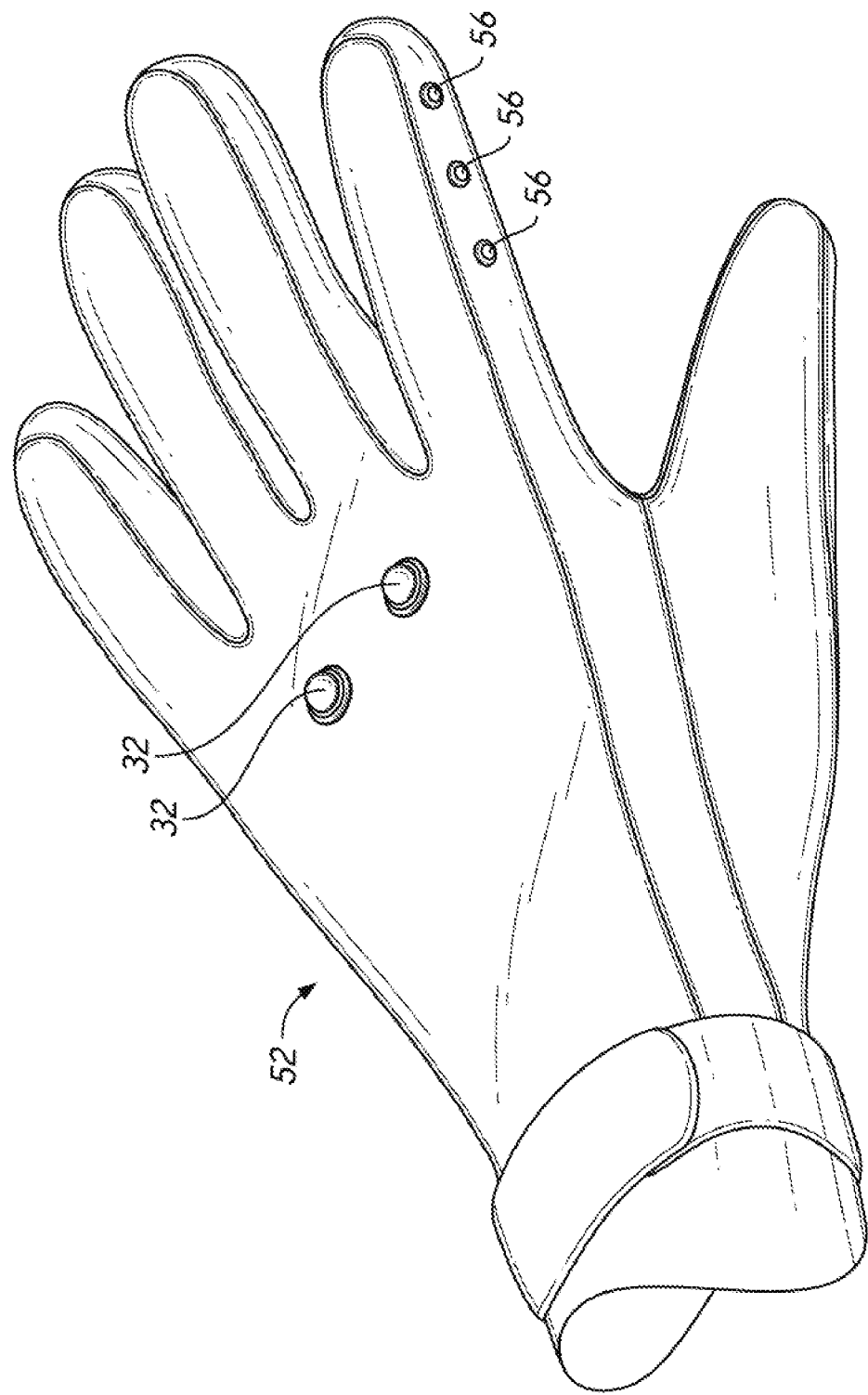
FIG. 8 is a perspective view, showing touchscreen selectors of differing sizes and in various locations on a glove.

FIG. 8 shows still another embodiment. In this version, two tactile touchscreen selectors 32 (of the type shown in FIG. 4) have been added to the back trank of the glove. These allow selections to be made with the back of the hand (while unusual this is a method that is known in some aircraft). Smaller selectors can be provided in other locations. In the example of FIG. 8, three smaller selectors 56 are placed along the side of the index finger. These devices indicate to the pilot that the hand is properly positioned against a lateral stop (as in the case of some hand-on-throttle applications). The locations shown are exemplary as the inventive selector can be placed in many other locations. The reader should also bear in mind that a glove is only one type of garment that may be used to mount the inventive tactile touchscreen selector.

The gloves used in the illustrations are slip-on flight gloves. It is also possible to apply the present invention to pressurized gloves in which the cuff is sealed to a pressure suit. Returning to FIG. 4, those skilled in the art will realize that the seals between the fourchette and housing 40, as well as the seal between housing 40 and conductive mesh 38 can be made pressure tight (or in the alternative allow only a small leak rate).

The materials selected for the tactile touchscreen selector are significant, in that a conductive path should be maintained between conductive mesh 34 and the user. This can be done via fourchette 20 but it is more preferably done through housing 40 and base 46. In the version shown, the housing and the base are made from thin-walled aluminum. They could also be made from thermoplastic resin with a conductive additive. Plunger 36 can be made from a conductive material in order to ensure a conductive connection between tip 60 and the user's finger. Plunger 36 can be made from a thermoplastic resin with a conductive additive. Any of the relatively rigid components can also be made conductive via the addition of a conductive coating—such as nickel. The reader should bear in mind that in many instances the use of a conductive material for plunger 44 is unnecessary, since the other components 40, 46 will tend to remain in contact with the fingertip.

In some embodiments the inventive selector may not be used to interact with a touchscreen and may instead only provide tactile feedback. FIG. 8 provides a possible example. Selectors 56 along the side of the index finger need not be configured to interact with a touchscreen. In those examples, the use of a conductive material for any portion of the selector is unnecessary. The invention will thus be generally referred to as a "tactile selector" with an embodiment configured for a capacitive touchscreen being referred to as a "tactile touchscreen selector."

The preceding description contains significant detail, but it should not be construed as limiting the scope of the invention but rather as providing illustrations of the preferred embodiments of the invention. Thus, the scope of the invention should be fixed by the claims ultimately drafted, rather than by the examples given.

Having described my invention, I claim:

1. A glove providing tactile feedback to a user's fingertip when a user exerts force upon an external surface; comprising:
   (a) a first fingertip region of said glove, having an interior volume within said glove housing said user's fingertip;
   (b) a tactile selector mounted in said first fingertip region, including,
      (i) a conductive flexible layer having a tip extending outward from said glove,
      (ii) a conductive base lying within said interior volume of said glove, said base being connected to said conductive flexible layer,
      (iii) a plunger slidably connected to said base, said plunger having a proximal end contacting said conductive flexible layer and a distal end proximate said base,
      (iv) a spring element configured to urge said plunger toward said tip,
      (v) said plunger having a tactile surface on said distal end of said plunger;
   (c) said base being positioned to contact said fingertip, thereby providing a conductive path from said fingertip to said conductive flexible layer; and
   (d) said tactile touchscreen selector configured such that when said fingertip presses said tactile selector against said external surface said tactile surface is urged out of said base and against said user's fingertip—thereby providing said tactile feedback.

2. The glove providing tactile feedback as recited in claim 1, wherein said spring element is a resilient collar.

3. The glove providing tactile feedback as recited in claim 1, wherein said tactile selector is mounted in an opening in said glove.

4. The glove as recited in claim 3, wherein said tactile selector is bonded to said glove by an adhesive.

5. The glove as recited in claim 1, wherein said plunger is conductive.

6. The glove as recited in claim 1, wherein said tactile surface of said plunger is configured to lie flush with said base until said user exerts said force on said external surface.

7. The glove as recited in claim 1, wherein said base and said plunger are contained within a housing and said housing is bonded to said glove.

8. A glove providing tactile feedback to a user's fingertip when a user exerts force to engage a touchscreen and make a pick on said touchscreen, comprising:
   (a) a first fingertip region of said glove, having an interior volume within said glove configured to house said user's fingertip;
   (b) a tactile selector mounted in said first fingertip region, including,
      (i) a conductive flexible layer having a tip extending outward from said glove,
      (ii) a conductive base lying within said interior volume of said glove, said base being connected to said conductive flexible layer,
      (iii) a plunger slidably disposed within said base, said plunger having a proximal end extending out toward said tip and a distal end proximate said base;
      (iv) a spring element configured to urge said plunger toward said tip,
      (v) said plunger having a tactile surface on said distal end of said plunger;
   (c) said base being positioned to contact said fingertip, thereby providing a conductive path from said fingertip to said conductive flexible layer so that said user can interact with said touchscreen; and
   (d) said tactile touchscreen selector configured such that when said fingertip presses said tactile selector against said touchscreen hard enough to make said pick said tactile surface is urged out of said base and against said user's fingertip—thereby providing said tactile feedback.

9. The glove providing tactile feedback as recited in claim 8, wherein said spring element is a resilient collar.

10. The glove providing tactile feedback as recited in claim 8, wherein said tactile selector is mounted in an opening in said glove.

11. The glove as recited in claim 10, wherein said tactile selector is bonded to said glove by an adhesive.

12. The glove as recited in claim 8, wherein said plunger is conductive.

13. The glove as recited in claim 8, wherein said tactile surface of said plunger is configured to lie flush with said base until said user exerts a force sufficient to make said pick on said touchscreen.

14. The glove as recited in claim 8, wherein said base and said plunger are contained within a housing.

15. A glove providing tactile feedback to a portion of a user's hand when a user exerts force upon an external surface, comprising:
 (a) a first region of said glove, having an interior volume within said glove configured to house said portion of said user's hand;
 (b) a tactile selector mounted in said first region of said glove, including,
  (i) a base lying within said interior volume of said glove,
  (ii) a plunger slidably connected to said base, said plunger having a proximal end extending out from said glove and a distal end proximate said base;
  (iii) a spring element configured to urge said plunger out from said glove,
  (iv) said plunger having a tactile surface on said distal end of said plunger, said tactile surface configured to remain flush with said base when said user is not exerting said force on said external surface; and
 (c) said tactile selector configured so that said tactile surface protrudes out of said base when said user exerts said force against said external surface—thereby providing said tactile feedback.

16. The glove providing tactile feedback as recited in claim 15, wherein said spring element is a resilient collar.

17. The glove providing tactile feedback as recited in claim 15, wherein said tactile selector is mounted in an opening in said glove.

18. The glove as recited in claim 17, wherein said tactile selector is bonded to said glove by an adhesive.

19. The glove as recited in claim 15, wherein said plunger is conductive.

20. The glove as recited in claim 15, wherein said proximal end of said plunger is smoothly curved.

* * * * *